United States Patent
Suzuki

(10) Patent No.: US 8,694,220 B2
(45) Date of Patent: Apr. 8, 2014

(54) LEFT-RIGHT WHEEL DRIVE FORCE DISTRIBUTION CONTROL APPARATUS FOR A VEHICLE

(75) Inventor: Shinichi Suzuki, Kawasaki (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 13/806,668

(22) PCT Filed: Jul. 5, 2011

(86) PCT No.: PCT/JP2011/065396
§ 371 (c)(1),
(2), (4) Date: Dec. 21, 2012

(87) PCT Pub. No.: WO2012/005262
PCT Pub. Date: Jan. 12, 2012

(65) Prior Publication Data
US 2013/0103229 A1    Apr. 25, 2013

(30) Foreign Application Priority Data
Jul. 9, 2010    (JP) .................................. 2010-156662

(51) Int. Cl.
*G06F 19/00* (2011.01)

(52) U.S. Cl.
USPC ........................................................ 701/69

(58) Field of Classification Search
CPC .............. B60W 10/16; B60W 10/119; B60W 2510/12; B60W 2520/40; B60W 2520/406; B60W 2710/12; B60W 2720/40; B60W 2720/406
USPC ........... 701/1, 36, 69; 180/233, 245, 246, 248
See application file for complete search history.

(56) References Cited

U.S. PATENT DOCUMENTS

| | | | | |
|---|---|---|---|---|
| 5,172,961 A | * | 12/1992 | Inoue et al. ................... | 303/146 |
| 5,267,783 A | * | 12/1993 | Inoue et al. ................... | 303/146 |
| 5,341,296 A | * | 8/1994 | Yasuno et al. ................. | 701/70 |
| 7,680,576 B2 | * | 3/2010 | Nagura et al. ................. | 701/69 |

FOREIGN PATENT DOCUMENTS

| | | |
|---|---|---|
| GB | 2217277 | 10/1989 |
| JP | 62-241732 | 10/1987 |
| JP | 154021/1989 | 10/1989 |
| JP | 4-19229 | 1/1992 |
| JP | 10-16599 | 1/1998 |
| JP | 3116685 | 12/2000 |
| JP | 2005-14657 | 1/2005 |

* cited by examiner

Primary Examiner — Helal A Algahaim
Assistant Examiner — Genna Mott
(74) Attorney, Agent, or Firm — Global IP Counselors, LLP

(57) ABSTRACT

In a transient control computing section, a left-right drive force difference transient control gain computing section finds a left-right drive force difference transient control gain α that is smaller than 1 in a region where a target yaw rate change rate is small, i.e., a low speed steering region, and a left-right drive force difference transient control computation value calculating section finds a left-right rear wheel drive force difference transient control computation value. The transient control computing section then multiplies the left-right rear wheel drive force difference transient control computation value by the left-right drive force difference transient control gain α to calculate the left-right rear wheel drive force difference transient control amount and contributes the same to a drive force distribution control for left and right wheels (left and right rear wheels).

6 Claims, 5 Drawing Sheets

LEFT-RIGHT WHEEL DRIVE FORCE DISTRIBUTION CONTROL APPARATUS FOR A VEHICLE

CROSS-REFERENCE TO RELATED APPLICATIONS

This application is a U.S. National stage application of International Application No. PCT/JP2011/065396, filed Jul. 5, 2011, which claims priority claims priority under to Japanese Patent Application No. 2010-156662, filed in Japan on Jul. 9, 2010, the entire contents of which is hereby incorporated by reference.

BACKGROUND

1. Field of the Invention

The present invention generally relates to a left-right wheel drive force distribution control apparatus for a vehicle.

2. Background Information

Japanese Patent Publication No. 3,116,685 presents an example of a conventional left-right wheel drive force distribution control apparatus for a vehicle. The proposed technology relates to a transient control of a left-right wheel drive force distribution that accomplishes a target behavior change (typically a change of yaw rate) corresponding to a change of a vehicle operating state. The left-right wheel drive force distribution is controlled according to a steering speed imposed by a driver such that the difference between the drive forces of the left and right wheels is larger when the steering speed is high. As a result, a transient response can be improved during high-speed steering.

SUMMARY

However, in a low-speed steering region where the steering speed is low, the responsiveness and trackability of the vehicle behavior with respect to the steering speed are high and the effect of the aforementioned transient control of the left-right wheel drive force distribution is small. Consequently, if the transient control is executed when the steering speed is low in the conventional manner, then such problems as a decline in the fatigue life of power transmitting parts and a degradation of the fuel efficiency will be incurred.

The preset invention was conceived in view of this situation and its object is to provide a vehicle left-right wheel drive force distribution control apparatus configured to avoid the aforementioned problems by weakening the effect of the transient control of the left and right wheel drive force distribution in the low-speed steering region.

In order to achieve this object, a vehicle left-right wheel drive force distribution control apparatus according to this invention decreases a left-right drive force difference transient control amount when the steering speed is smaller than a first prescribed value.

As a result, the present invention can solve the aforementioned problems of the conventional device by weakening the effect of the transient control of the left and right wheel drive force distribution in the low-speed steering region.

BRIEF DESCRIPTION OF THE DRAWINGS

Referring now to the attached drawings which form a part of this original disclosure.

DETAILED DESCRIPTION OF THE EMBODIMENTS

Figure 1:
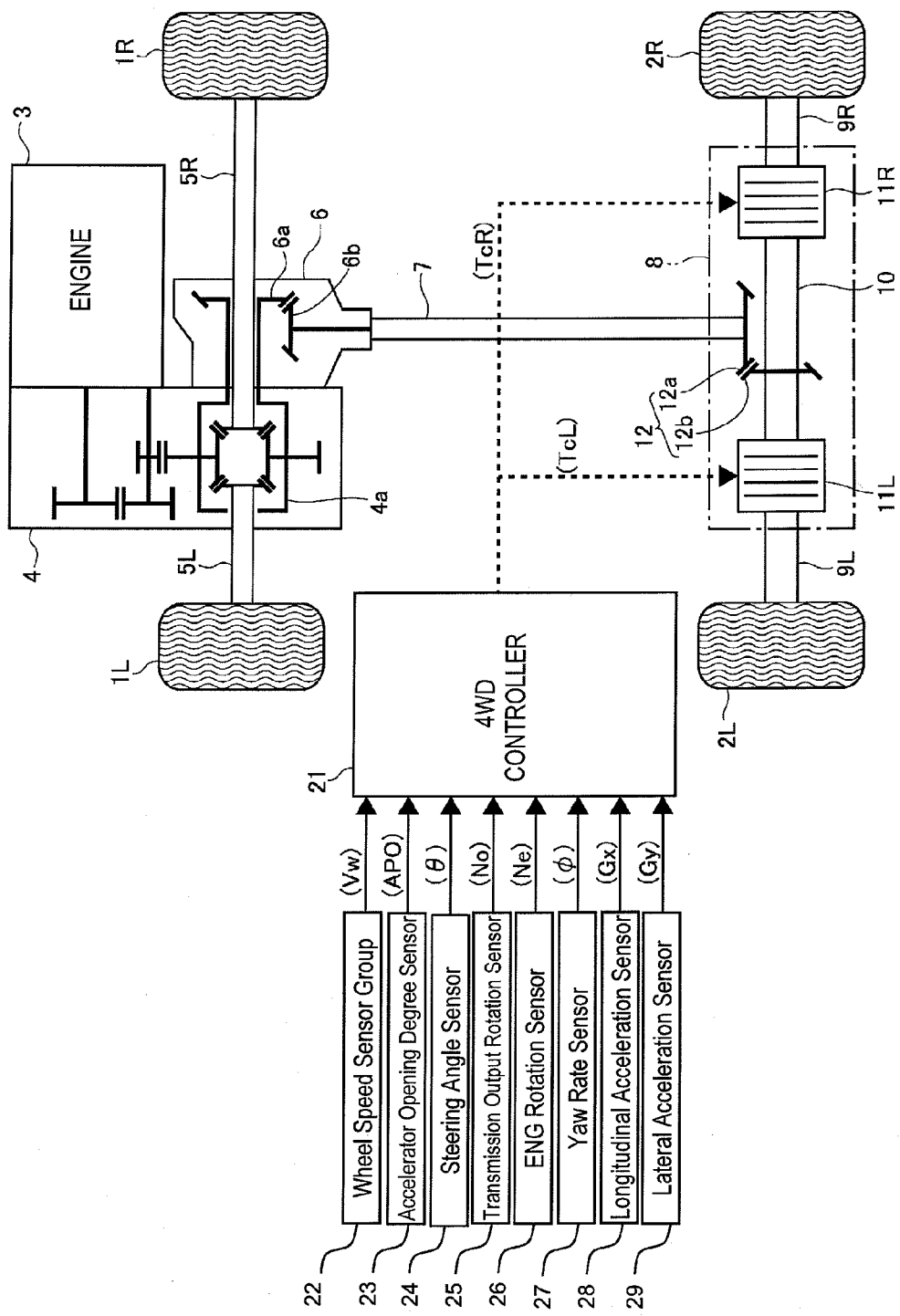
FIG. 1 is a schematic plan view showing a wheel drive train of a four-wheel drive vehicle equipped with a left-right wheel drive force distribution control apparatus according to an embodiment of the present invention as viewed from above the vehicle. A four-wheel drive control system is also shown.

An embodiment of the present invention is described in detail below with reference to the embodiment in the drawings.

FIG. 1 is a schematic plan view showing a wheel drive train of a four-wheel drive vehicle equipped with a left-right wheel drive force distribution control apparatus according to an embodiment of the present invention as viewed from above the vehicle. A four-wheel drive control system is also shown. The figure shows left and right front wheels 1L and 1R serving as main drive wheels and left and right rear wheels 2L and 2R serving as subordinate drive wheels. In this patent specification, the term "drive force" refers not to power but to a torque value.

The reference numeral 3 indicates an engine serving as a prime mover. Torque from the engine 3 is multiplied by a transmission 4 (transaxle that includes a differential gear device 4a) and transferred toward the left and right front wheels 1L and 1R through left and right axle shafts 5L and 5R, thereby serving to drive the left and right front wheels 1L and 1R. A portion of the drive force exiting the transmission 4 and heading toward the left and right front wheels 1L and 1R is redirected toward the left and right rear wheels 2L and 2R by a transfer case 6. A drive train used to accomplish this redirection will now be explained.

The transfer case 6 has a bevel gear set comprising an input hypoid gear 6a and an output hypoid gear 6b. The input hypoid gear 6a is coupled to a differential gear case serving as an input rotary member of the differential gear device 4a such that the input hypoid gear rotates together with the differential gear case. The output hypoid gear 6b is coupled to a front end of the propeller shaft 7, and the propeller shaft 7 is arranged to extend rearward toward a left-right rear wheel drive force distributing unit 8. The transfer case 6 sets a gear ratio of the bevel gear set comprising the hypoid gear 6a and the output hypoid gear 6b such that a portion of a drive force heading toward the left and right front wheels 1L and 1R is converted to a higher rotational speed and outputted toward the propeller shaft 7.

The high-speed rotational power outputted to the propeller shaft 7 is distributed to the left and right rear wheels 2L and 2R by the left-right rear wheel drive force distributing unit 8 in accordance with a control explained later. The left-right rear wheel drive force distributing unit 8 has a center shaft 10 that is arranged between the axle shafts 9L and 9R of the left and right rear wheels 2L and 2R and extends along the axial direction of the shafts 9L and 9R. The left-right rear wheel drive force distributing unit 8 also has a left rear wheel clutch (left subordinate drive wheel friction element) 11L and a right rear wheel clutch (right subordinate drive wheel friction element) 11R. The left rear wheel clutch 11L is arranged between the center shaft 10 and the left rear wheel axle shaft 9L and serves to control a connection between the shafts 10 and 9L. The right rear wheel clutch 11R is arranged between the center shaft 10 and the right rear wheel axle shaft 9R and serves to control a connection between the shafts 10 and 9R.

A bevel gear type final reduction gear 12 provides a drive connection between the center shaft 10 and a rearward end of the propeller shaft 7 extending rearward from the transfer case 6. The final reduction gear 12 comprises an input hypoid gear 12a and an output hypoid gear 12b. The reduction gear ratio of the final reduction gear 12 is set in relation to the speed-increasing gear ratio of the transfer case 6 (speed increasing gear ratio resulting from the bevel gear set comprising the hypoid gear 6a and the output hypoid gear 6b) to such a gear ratio that the portion of the drive force heading toward the left and right front wheels 1L and 1R that is redirected toward the center shaft 10 is delivered to the center shaft 10 with an increased rotational speed. In this embodiment, a total gear ratio of the transfer case 6 and the final reduction gear 12 is set such that a rotational speed of the center shaft 10 is increased with respect to the left and right front wheels 1L and 1R.

The reason for setting the total gear ratio of the transfer case 6 and the final reduction gear 12 in this way will now be explained. If the rotational speed of the center shaft 10 is not increased, then whichever of the left and right rear wheels 2L and 2R is the outside rear wheel during the turn will rotate at a higher rotational speed than the center shaft 10. Under such conditions, if the clutch 11L (or 11R) corresponding to the rear wheel 2L (or 2R) located on the outside of the turn is engaged, then the high rotational speed of that rear wheel will be dragged down by the more slowly rotating center shaft 10 until the rotational speed decreases to the rotational speed of the center shaft 10. Consequently, the center shaft 10 will not be able to transmit a drive force to the rear wheel 2L (or 2R) located on the outside of the turn and it will not be possible to achieve the intended drive force distribution control. As a result, the four-wheel drive control will not function properly.

Therefore, in order to ensure that during a turn the rotational speed of the center shaft 10 does not fall below the rotational speed of the rear wheel 2L (or 2R) located on the outside of the turn and cause the drive force distribution control to be ineffective, the total gear ratio of the transfer case 6 and the final reduction gear 12 is set as explained previously and the center shaft 10 is rotated at an increased rotational speed as explained previously. By rotating the center shaft 10 at an increased rotational speed, the drive force distribution control explained later can be accomplished as intended.

In the wheel drive train of the four-wheel drive vehicle explained above, torque from the engine 3 is multiplied by a gear ratio at the transmission (transaxle) 4 and transferred to the left and right front wheels 1L and 1R, thus driving the left and right front wheels 1L and 1R. While this is occurring, a portion of the drive force heading toward the left and right front wheels 1L and 1R is transferred successively from the transfer case 6 to the propeller shaft 7, to the final reduction gear 12, and to the center shaft 10 at an increased rotational speed. The holding forces of the clutches 11L and 11R are controlled such that the clutches 11L and 11R slip in accordance with the amount of rotational speed increase while the left and right rear wheels 2L and 2R are driven. Thus, with the left and right front wheels 1L and 1R and the left and right rear wheels 2L and 2R driven in this way, the vehicle can be operated in four-wheel drive.

In this four-wheel drive vehicle, it is necessary to control the holding forces of the left rear wheel clutch 11L and the right rear wheel clutch 11R. In order to further the performance of this four-wheel drive vehicle when starting into motion from a stopped condition and when accelerating, the vehicle is further configured such that a front-rear wheel drive force distribution control can be executed by controlling a total holding force of the left wheel clutch 11L and the right wheel clutch 11R. Additionally, in order to improve a turning performance of the vehicle and execute a behavior control such that an actual behavior (actual yaw rate, etc.) of the vehicle matches a target based on an operating state and a traveling condition of the vehicle, a left-right wheel drive force distribution control is executed by controlling the holding forces of the left rear wheel clutch 11L and the right rear wheel clutch 11R.

Therefore, a holding force control system of the left rear wheel clutch 11L and the right rear wheel clutch 11R is configured as will now be explained. Each of the left rear wheel clutch 11L and the right rear wheel clutch 11R is an electromagnetic clutch in which the holding force is determined based on a supplied current. A four-wheel drive (4WD) controller 21 accomplishes the aforementioned front-rear wheel drive force distribution control and left-right wheel drive force distribution control by electronically controlling electric currents supplied to the clutches 11L and 11R such that the holding forces of the clutches 11L and 11R correspond to target drive forces TcL and TcR of the left and right rear wheels 2L and 2R, respectively, which are computed as will be explained later.

In order to compute a target drive force TcL of the left wheel 2L and a target drive force TcR of the right wheel, the four-wheel drive controller 21 receives the following input signals: a signal from a wheel speed sensor group 22 that detects a wheel speed Vw of each of the wheels 1L, 1R, 2L, and 2R; a signal from an accelerator opening degree sensor 23 that detects an accelerator opening degree APO as an accelerator pedal depression amount; a signal from a steering sensor 24 that detects a steering wheel steering angle θ; a signal from a transmission output rotation sensor 25 that detects a transmission output rotational speed No; a signal from an engine rotation sensor 26 that detects an engine rotational speed Ne; a signal from a yaw rate sensor 27 that detects a yaw rate φ about a vertical axis passing through a center of gravity of the vehicle; a signal from a longitudinal acceleration sensor 28 that detects a longitudinal acceleration Gx of the vehicle; and a lateral acceleration signal 29 that detects a lateral acceleration Gy of the vehicle.

Based on the input information just explained, the four-wheel drive controller 21 computes a left rear wheel target drive force TcL and a right rear wheel target drive TcR to be used for the front-rear wheel drive force distribution control and the left-right wheel drive force distribution control and electronically controls the holding forces (electric currents) of the left rear wheel clutch 11L and the right rear wheel clutch 11R such that the drive forces of the left and right rear wheels 2L and 2R match the target drive forces TcL and TcR.

[Drive Force Distribution Control]

The front-rear wheel drive force distribution control and the left-right wheel drive force distribution control executed by the four-wheel drive controller 21, i.e., the method of setting the left rear wheel target drive force TcL and the right rear wheel target drive force TcR, will now be explained. As shown in function-specific block diagram of FIG. 2, the four-wheel drive controller 21 comprises an input signal processing section 31, a rear wheel total drive force computing section 32, a left-right rear wheel drive force difference computing section 33, a feedback control section 34, and a left-right rear wheel target drive force computing section 35.

The input signal processing section 31 removes noise from the detection signals of the wheel speed sensor group 22, the accelerator opening degree sensor 23, the steering angle sensor 24, the transmission output rotation sensor 25, the engine rotation sensor 26, the yaw rate sensor 27, the longitudinal acceleration sensor 28, and the lateral acceleration sensor 29 and pre-processes the signals such that they can be used in computations that will be explained later. Among these pre-processed signals, the engine rotational speed Ne and the accelerator opening degree APO are used by an engine torque estimating section 36 to estimate an engine torque Te, and the engine rotational speed Ne and the transmission output rotational speed No are used by a transmission gear ratio computing section 37 to compute a transmission gear ratio γ.

An example of how the rear wheel total drive force computing section 32 computes a total drive force target value rTcLR (hereinafter called "total drive force rTcLR") for the left and right rear wheels 2L and 2R will now be explained. First, the drive force computing section 32 computes an input torque Ti to the differential gear device 4a based on the engine torque Te and the transmission gear ratio γ. Next, the computing section 32 calculates left-right front wheel average speed and a left-right rear wheel average speed based on signals (wheel speeds Vw) from the wheel speed sensor group 22 and determines a degree of drive slippage of the left and right front wheels 1L and 1R estimated by comparing the two average speeds. The computing section 32 also determines how much of the input torque Ti to direct toward the left and right rear wheels 2L and 2R in accordance with the degree of drive slippage, the longitudinal acceleration, and the accelerator opening degree APO and sets that amount as a total drive force rTcLR to be directed to the rear wheels.

The larger the aforementioned front wheel slippage is, the larger the total drive force rTcLR to be directed to the rear wheels needs to be in order to suppress the slippage. Meanwhile, the larger the longitudinal acceleration Gx and the accelerator opening degree APO are, the larger the drive force requested by the driver is and the larger the total drive force rTcLR directed to the rear wheels needs to be in order to satisfy the request.

The left-right rear wheel drive force difference computing section 33 has a steady-state control computing section 33a and a transient control computing section 33b and calculates a drive force difference target value rΔTcLR (hereinafter called drive force difference rΔTcLR) between the left and right rear wheels 2L and 2R as, for example, will now be explained. The steady-state control computing section 33a calculates a left-right rear wheel drive force difference steady-state control amount cΔTcLR for achieving a vehicle turning behavior requested by a driver in a steady manner as will now be explained. The steady-state control computing section 33a estimates a longitudinal acceleration rate Gx of the vehicle based on the engine torque Te and the transmission gear ratio γ and a lateral acceleration rate Gy of the vehicle based on a steering angle θ and a vehicle speed VSP. An under-steering state (state in which an actual turning behavior is insufficient in relation to a target turning behavior) can be ascertained based on a combination of the estimated longitudinal acceleration rate Gx and the lateral acceleration rate Gy. The steady-state control computing section 33a determines a left-right rear wheel drive force difference necessary to resolve the under-steering state as a left-right rear wheel drive force steady-state control amount cΔTcLR. The reason estimated values of the longitudinal acceleration rate Gx and the lateral acceleration rate Gy are used instead of detected values is that the steady-state control computing section 33a is a feed forward control system and an estimated value matches the actual state of the control better than a detected value, which is a result value.

Thus, while the steering angle θ is near 0 (while the wheels are not being turned), the left-right rear wheel drive force difference steady-state control amount cΔTcLR is held at 0 because the lateral acceleration rate Gy equals 0. Conversely, while the steering angle θ is not near 0 (while the wheels are being turned), the lateral acceleration rate Gy increases as the steering angle θ and the vehicle speed VSP increase and there is a strong tendency for the vehicle to experience under-steering. Consequently, the left-right rear wheel drive force difference steady-state control amount cΔTcLR increases. Furthermore, as the longitudinal acceleration rate Gx increases, the tendency for the vehicle to experience under-steering strengthens and the left-right rear wheel drive force difference steady-state control amount cΔTcLR increases.

Figure 3:
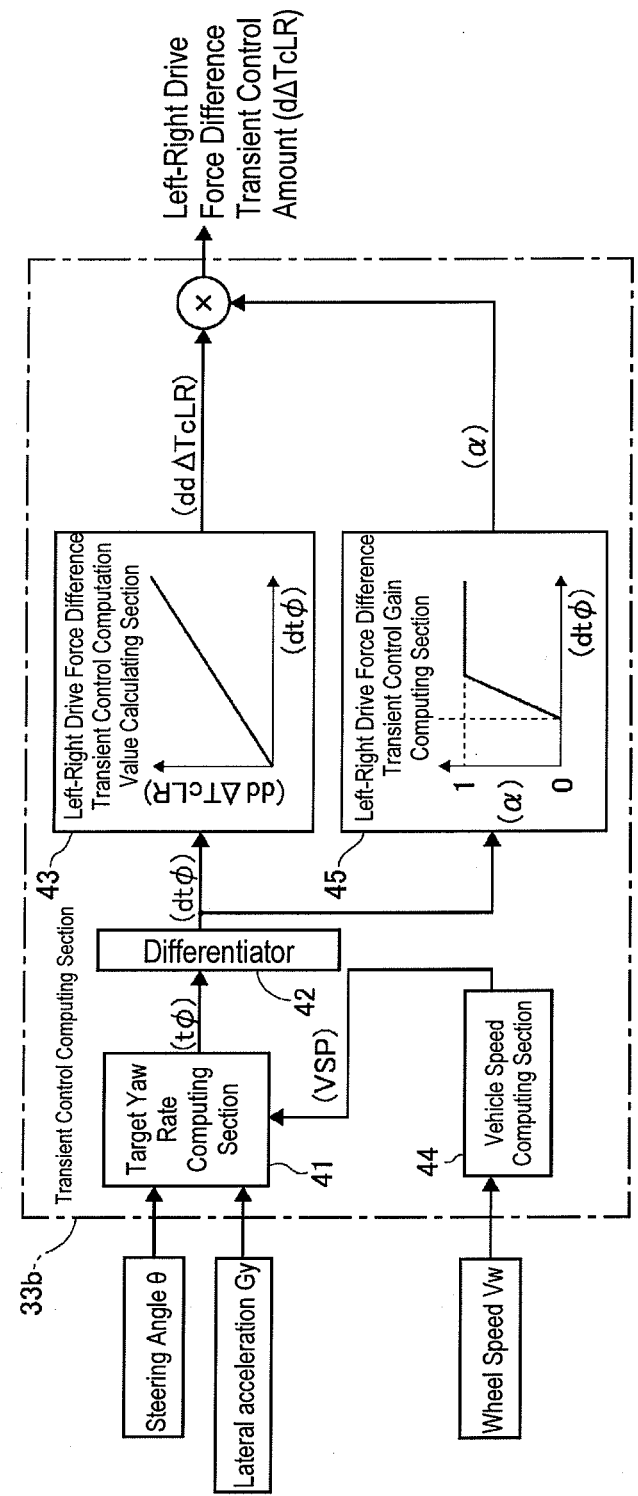
FIG. 3 is a function-specific block diagram of the transient control computing section shown in FIG. 2.

The transient control computing section 33b calculates a left-right rear wheel drive force difference transient control amount dΔTcLR for achieving a turning response requested by a driver in a transient manner due to the change rate of the steering angle θ while traveling at the current vehicle speed VSP. As shown in FIG. 3, the transient control computing section 33b comprises a target yaw rate computing section 41, a differentiator 42, a left-right drive force difference transient control computation value calculating section 43, a vehicle speed computing section 44, and a left-right drive force difference transient control gain computing section 45.

The target yaw rate computing section 41 computes a target yaw rate tφ desired by the driver based on the steering angle θ and a vehicle speed VSP calculate by the vehicle speed computing section 44 based on the wheel speeds Vw. The target yaw rate computing section 41 limits the target yaw rate tφ based on the lateral acceleration Gy. The target yaw rate tφ is set to have such a characteristic that its value increases as the vehicle speed VSP increases and as the absolute value of the steering angle θ increases, but an upper limit value is set such that an excessive or unattainable target yaw rate tφ is not calculated. The differentiator 42 differentiates the target yaw rate tφ to calculate a change rate dtφ of the target yaw rate. Thus, the target yaw rate computing section 41 and the differentiator 42 constitute a target yaw rate change rate computing means (steering speed detecting means) according to the present invention.

Based on the change rate dtφ of the target yaw rate tφ (hereinafter called "target yaw rate change rate dtφ"), the left-right drive force difference transient control computation value calculating section 43 executes a map search to find a left-right rear wheel drive force difference transient control computation value ddΔTcLR that will be a basic target value for achieving the turning response requested by the driver in a transient manner. The target yaw rate change rate dtφ is a value obtained by differentiating the target yaw rate tφ calculated based on the steering angle θ and is equivalent to a transient turning response request of the driver. Thus, the left-right drive force difference transient control computation value calculating section 43 constitutes a left-right drive force difference transient control amount computing means according to the present invention. The left-right rear wheel drive force difference transient control computation value ddΔTcLR is set to be larger when the target yaw rate change rate dtφ is higher because a higher turning response is desired when the change rate dtφ is higher. The reason the target yaw rate change rate $dt\phi$ is used instead of a change rate of a yaw rate detection value $\phi$ is that the transient control computing section 33b is a feed forward control system and the target yaw rate $t\phi$ (which is an estimated value) matches the actual state of the control better than a detected value $\phi$ (which is a result value).

The left-right drive force difference transient control gain computing section 45 serves to set a left-right drive force difference transient control gain $\alpha$. The left-right drive force difference transient control gain a is multiplied by the aforementioned left-right rear wheel drive force difference transient control computation value $dd\Delta TcLR$ to calculate a left-right rear wheel drive force difference transient control amount $d\Delta TcLR$. Thus, the left-right drive force difference transient control gain computing section 45 and the left-right drive force difference transient control computation value calculating section 43 together constitute a left-right drive force difference transient control amount computing means according to the present invention. The left-right drive force difference transient gain computing section 45 searches, for example, the map shown in FIG. 4 or FIG. 5 to find the left-right drive force difference transient control gain $\alpha$ based on the target yaw rate change rate $dt\phi$.

Figure 4:
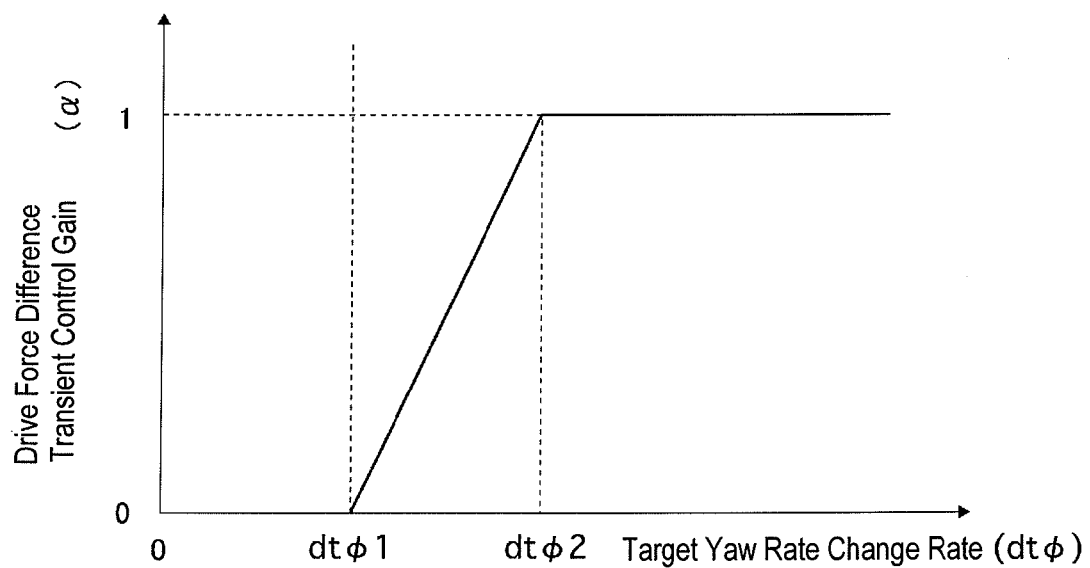
FIG. 4 is a characteristic curve diagram showing an example of a change characteristic of a left-right drive force difference transient control gain used by the transient control computing section shown in FIG. 2.
Figure 5:
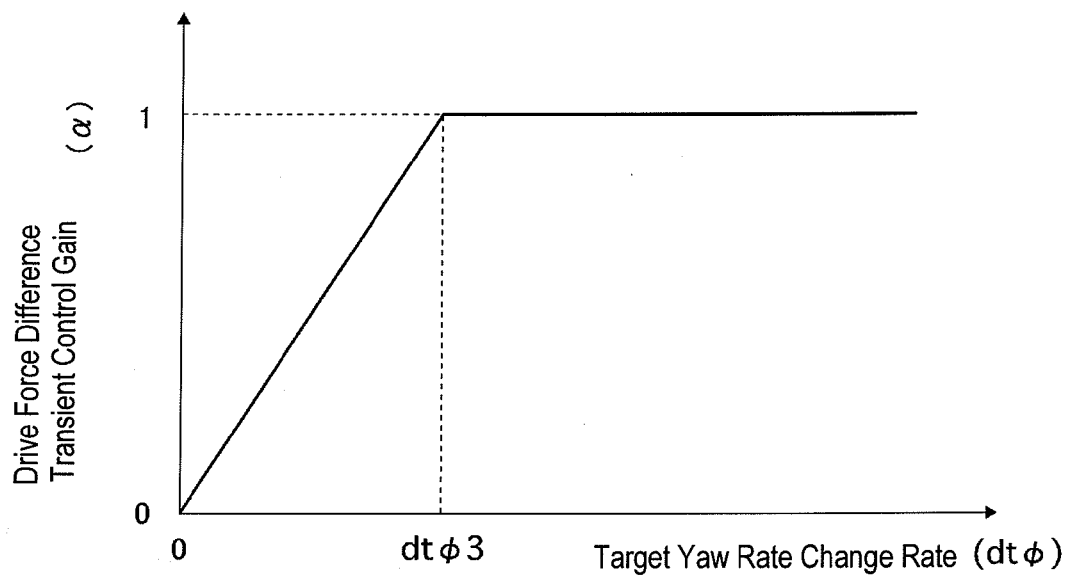
FIG. 5 is a characteristic curve diagram showing another example of a change characteristic of a left-right drive force difference transient control gain used by the transient control computing section shown in FIG. 2.

As shown in FIGS. 4 and 5, the left-right drive force difference transient control gain a is a positive value that varies between 0 and 1 in accordance with the target yaw rate change rate $dt\phi$. In any case, when the target yaw rate change rate $dt\phi$ is in a low region, the left-right drive force difference transient control gain $\alpha$ is set to have a value smaller than 1. Since the target yaw rate $t\phi$ has a value that increases as the absolute value of the steering angle $\theta$ increases, a region where the target yaw rate change rate $dt\phi$ is low is equivalent to a region where a derivative value of the steering angle $\theta$ (steering angular speed $d\phi$) is small, i.e., a low-speed steering region where the driver is operating the steering wheel slowly. Therefore, in the following explanation, the region where the target yaw rate change rate $dt\phi$ is low shall be called "low-speed steering region" and the region where the target yaw rate change rate is high shall be called "medium to high speed steering region." In the case shown in FIG. 4, the left-right drive force difference transient control gain $\alpha$ has a value of 0 in a very-low-speed steering region where the target yaw rate change rate $dt\phi < dt\phi 1$ and a value of 1 in medium to high speed steering region where $dt\phi \geq dt\phi 2$. In a low speed steering region where $dt\phi 1 \leq dt\phi \leq dt\phi 2$, the gain value gradually decreases from 1 to 0 as the target yaw rate change rate $dt\phi$ decreases.

In the case shown in FIG. 5, the left-right drive force difference transient control gain $\alpha$ decreases gradually from 1 to 0 as the target yaw rate change rate $dt\phi$ decreases in a very low speed steering region and a low speed steering region where $0 \leq dt\phi < dt\phi 3$ and has a value of 1 in a medium to high speed steering region where the target yaw rate change rate $dt\phi \geq dt\phi 3$.

As shown in FIG. 3, the transient control computing section 33b multiplies the left-right drive force difference transient control gain $\alpha$ by the left-right rear wheel drive force difference transient control computation value $dd\Delta TcLR$ to calculate the left-right rear wheel drive force difference transient control amount $d\Delta TcLR$. Thus, the left-right rear wheel drive force difference transient control amount $d\Delta TcLR$ is equivalent to a value obtained by reducing the left-right rear wheel drive force difference transient control computation value $dd\Delta TcLR$ (which is a basic target value for achieving the turning response requested by the driver) according to the gain $\alpha$.

However, since the left-right drive force difference transient gain $\alpha$ is 1 in the medium to high speed steering region and has a positive value smaller than 1 in the low speed steering region as shown in FIG. 4 and FIG. 5, the left-right rear wheel drive force difference transient control amount $d\Delta TcLR$ is set to be the same as the left-right rear wheel drive force difference transient control computation value $dd\Delta TcLR$ in the medium to high speed steering region and decreased compared to the medium to high speed steering region in the low speed steering region.

When the left-right drive force difference transient control gain $\alpha$ is as shown in FIG. 4, the left-right rear wheel drive force difference transient control amount $d\Delta TcLR$ is 0 in the very low speed steering region where the target yaw rate change rate $dt\phi < dt\phi 1$, has the same value as the left-right rear wheel drive force difference transient control computation value $dd\Delta TcLR$ in the medium to high speed steering region where the target yaw rate change rate $dt\phi > dt\phi 2$, and gradually decreases from the same value as the left-right rear wheel drive force difference transient control computation value $dd\Delta TcLR$ to 0 in the low speed steering region where $dt\phi 1 \leq dt\phi < dt\phi 2$.

When the left-right drive force difference transient control gain $\alpha$ is as shown in FIG. 5, the left-right rear wheel drive force difference transient control amount $d\Delta TcLR$ gradually decreases from the same value as the left-right rear wheel drive force difference transient control computation value $dd\Delta TcLR$ to 0 as the target yaw rate change rate $dt\phi$ decreases in the very low speed steering region and the low speed steering region where $0 \leq dt\phi < dt\phi 3$ and has the same value as the left-right rear wheel drive force difference transient control computation value $dd\Delta TcLR$ in the medium to high speed steering region where $dt\phi \geq dt\phi 3$.

The left-right rear wheel drive force difference computing section 33 calculates a sum value of the left-right rear wheel drive force difference steady-state control amount $c\Delta TcLR$ calculated by the steady-state control computing section 33a as explained previously and the left-right rear wheel drive force difference transient control amount $d\Delta TcLR$ calculated by the transient control computing section 33b as explained previously and sets the sum value as a left-right rear wheel drive force difference $r\Delta TcLR$ to serve as a target during the vehicle turning behavior.

However, there are situations in which the actual turning behavior (actual yaw rate $\phi$) actually exhibited by the vehicle in response to the left-right rear wheel drive force difference $r\Delta TcLR$ is affected by a lateral wind or other external disturbance and does not match the target turning behavior (target yaw rate $t\phi$) requested through the steering operation performed by the driver. When the actual yaw rate $\phi$ and the target yaw rate $t\phi$ do not match, the feedback control section 34 revises the rear wheel total drive force $rTcLR$ and the rear wheel drive force difference $r\Delta TcLR$ as explained below such that a final rear wheel total drive force $TcLR$ and rear wheel drive force difference $\Delta TcLR$ are obtained.

The feedback control section 34 has a target yaw rate computing section 34a, a yaw rate deviation computing section 34b, and a feedback control coefficient computing section 34c. The target yaw rate computing section 34a computes a target yaw rate $t\phi$ desired by the driver based on the steering angle $\theta$, the lateral acceleration Gy, and the vehicle speed VSP (which is calculated based on the wheel speeds Vw). The yaw rate deviation computing section 34b computes a yaw rate deviation $\Delta\phi(=\phi-t\phi)$ between the target yaw rate $t\phi$ and a detected actual yaw rate $\phi$.

Based on the yaw rate deviation $\Delta\phi$, the feedback control coefficient computing section 34c determines if the vehicle is in an over-steered state in which the actual yaw rate φ exceeds the target yaw rate tφ beyond a dead band, in an under-steered state in which the actual yaw rate φ is insufficient with respect to the target yaw rate tφ beyond a dead zone, or in a neutral steering state in which the actual yaw rate φ is within dead zones in front of and behind the target yaw rate tφ. Based on this determination result, the feedback control coefficient computing section 34c sets a feedback control coefficient K1 (0 or 1) for the rear wheel total drive force rTcLR and a feedback control coefficient K2 (0 or 1) for the rear wheel drive force difference rΔTcLR.

The feedback control coefficient K1 is multiplied by the rear wheel total drive force rTcLR to calculate a revised final rear wheel total drive force TcLR, and the feedback control coefficient K2 is multiplied by the rear wheel drive force difference rΔTcLR to calculate a revised final rear wheel drive force difference ΔTcLR. Regarding setting the feedback control coefficients K1 and K2, if the feedback control coefficient computing section 34c determines that the vehicle is in an over-steered state (Φ>tΦ+dead band), then it sets the feedback control coefficient K1 for the rear wheel total drive force rTcLR to 0 and sets the feedback control coefficient K2 for the rear wheel drive force difference rΔTcLR to 0 in order to eliminate harmful effects caused by four-wheel drive travel. Setting the feedback control coefficient K1 to 0 causes the revised final rear wheel total drive force TcLR to be 0, and setting the feedback control coefficient K2 to 0 causes the revised final rear wheel drive force difference ΔTcLR to be 0. This means the vehicle travels in two-wheel drive and, as a result, the harmful effects that could result from traveling in four-wheel drive while in an over-steered state can be eliminated.

If the feedback control coefficient computing section 34c determines that the vehicle is in an under-steered state (Φ<tΦ−dead band), then, although there are no harmful effects caused by four-wheel drive travel, the feedback control coefficient computing section 34c sets the feedback control coefficient K1 for the rear wheel total drive force rTcLR to 1 and sets the feedback control coefficient K2 for the rear wheel drive force difference rΔTcLR to 0 in order to eliminate harmful effects caused by setting a drive force difference between the left and right rear wheels. Setting the feedback control coefficient K1 to 1 causes the revised final rear wheel total drive force TcLR to be set as TcLR=rTcLR, and setting the feedback control coefficient K2 to 0 causes the revised final rear wheel drive force difference ΔTcLR to be 0, which means that the vehicle is operated in four-wheel drive but a drive force difference is not set between the left and right rear wheels. As a result, excellent traction can be enjoyed by operating in four-wheel drive while in an under-steered state while eliminating the harmful effects of setting a drive force difference between the left and right rear wheels.

If the feedback control coefficient computing section 34c determines that the vehicle is in a neutral steering state (tΦ−dead band<Φ<tΦ+dead band), then the feedback control coefficient computing section 34c sets the feedback control coefficient K1 for the rear wheel total drive force rTcLR to 1 and sets the feedback control coefficient K2 for the rear wheel drive force difference rΔTcLR to 1 because there are no harmful effects caused by four-wheel drive travel and no harmful effects caused by setting a drive force difference between the left and right rear wheels. Setting the feedback control coefficient K1 to 1 causes the revised final rear wheel total drive force TcLR to be set as TcLR=rTcLR, and setting the feedback control coefficient K2 to 1 causes the revised final rear wheel drive force difference ΔTcLR to be set as ΔTcLR=rΔTcLR. This means that the vehicle is operated in four-wheel drive and a drive force difference is set between the left and right rear wheels.

Figure 6:
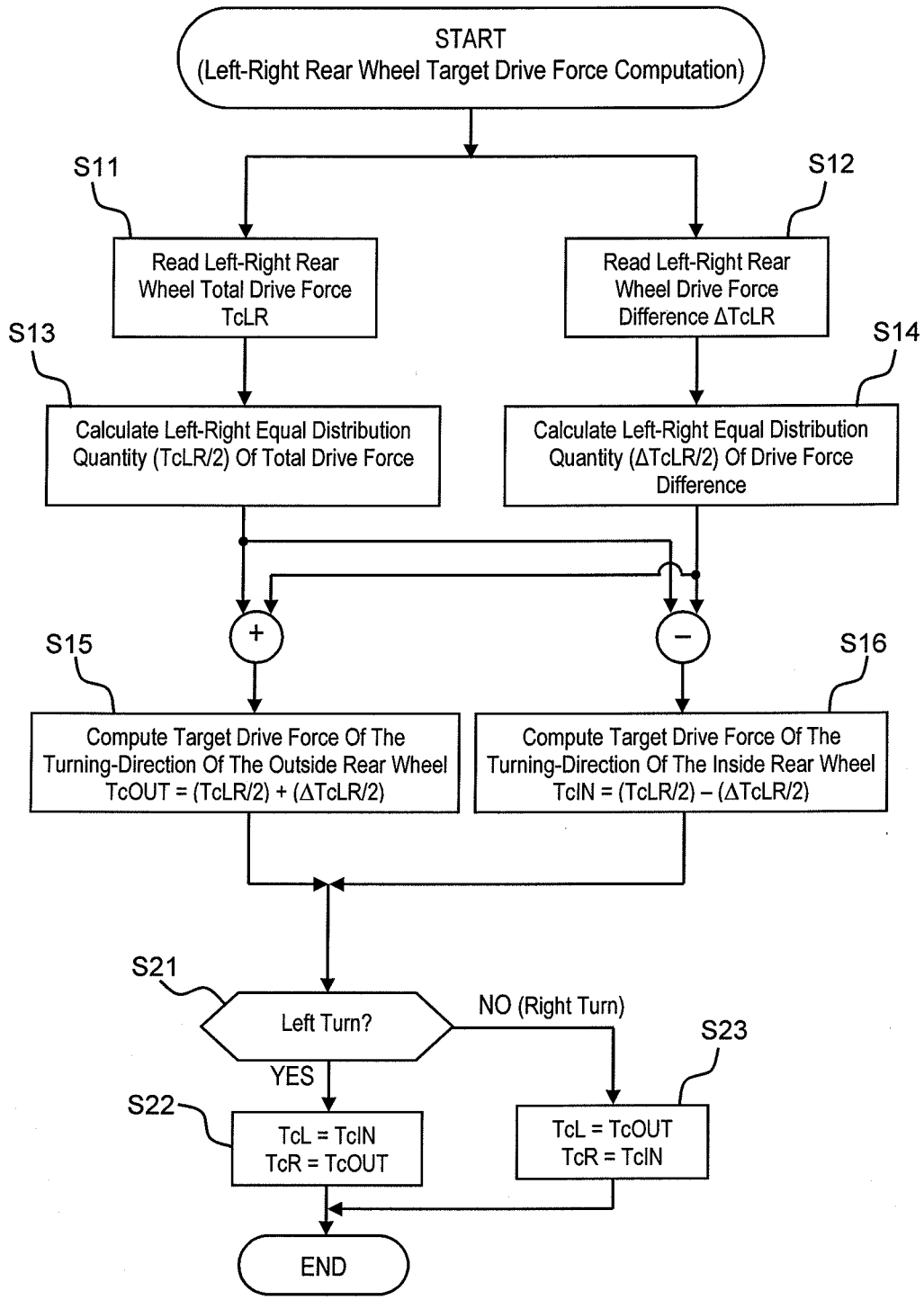
FIG. 6 is a flowchart showing a process by which the left-right rear wheel target drive force computing section shown in FIG. 2 computes left and right rear wheel target drive forces.

Based on the process shown in FIG. 6, the left-right rear wheel target drive force computing section 35 calculates a left rear wheel target drive force TcL and a right rear wheel target drive force TcR that satisfy both the left-right rear wheel total drive force TcLR and the left-right rear wheel drive force difference ΔTcLR, which are to be the revised final targets. In step S11 the left-right rear wheel target drive force computing section 35 reads the final rear wheel total drive force TcLR revised by the previously explained feedback control, and in step S12 the left-right rear wheel target drive force computing section 35 reads the final left-right rear wheel drive force difference ΔTcLR revised by the feedback control.

In step S13 the left-right rear wheel target drive force computing section 35 calculates a left-right equal distribution quantity TcLR/2 of the rear wheel total drive force TcLR read in step S11, and in step S14 the left-right rear wheel target drive force computing section 35 calculates a left-right equal distribution quantity ΔTcLR/2 of the rear wheel drive force difference ΔTcLR read in step S12. In step S15, the left-right rear wheel target drive force computing section 35 adds the rear wheel drive force difference left-right equal distribution quantity ΔTcLR/2 to the rear wheel total drive force left-right equal distribution quantity TcLR/2 to calculate a target drive force TcOUT TcLR/2+ΔTcLR/2) of the turning-direction outside rear wheel. In step S16, the left-right rear wheel target drive force computing section 35 subtracts the rear wheel drive force difference left-right equal distribution quantity ΔTcLR/2 from the rear wheel total drive force left-right equal distribution quantity TcLR/2 to calculate a target drive force TcIN (=TcLR/2−ΔTcLR/2) of the turning-direction inside rear wheel. Thus calculated, the target drive force TcOUT of the turning-direction outside rear wheel and the target drive force TcIN of the turning-direction inside rear wheel serve as a target drive force of the turning-direction outside rear wheel and a target drive force of the turning-direction inside rear wheel that achieve both the rear wheel total drive force TcLR and the rear wheel drive force difference ΔTcLR.

In step S21 and subsequent steps, the left-right rear wheel target drive force computing section 35 sets the left rear wheel target drive force TcL and the right rear wheel target drive force TcR based on the target drive force TcOUT of the turning-direction outside rear wheel and the target drive force TcIN of the turning-direction inside rear wheel as will now be explained. First, in step S21, the left-right rear wheel target drive force computing section 35 determines if the vehicle is undergoing a left turn or a right turn based on the steering angle θ and the yaw rate Φ. If it is a left turn, then in step S22 the left-right rear wheel target drive force computing section 35 sets the inside wheel target drive force TcIN as the target drive force TcL of the left rear wheel (which is the turning-direction inside wheel) and sets the outside wheel target drive force TcOUT as the target drive force TcR of the right rear wheel (which is the turning-direction outside wheel). Conversely, if it is a right turn, then in step S23 the left-right rear wheel target drive force computing section 35 sets the outside wheel target drive force TcOUT as the target drive force TcL of the left rear wheel (which is the turning-direction outside wheel) and sets the inside wheel target drive force TcIN as the target drive force TcR of the right rear wheel (which is the turning-direction inside wheel).

Figure 2:
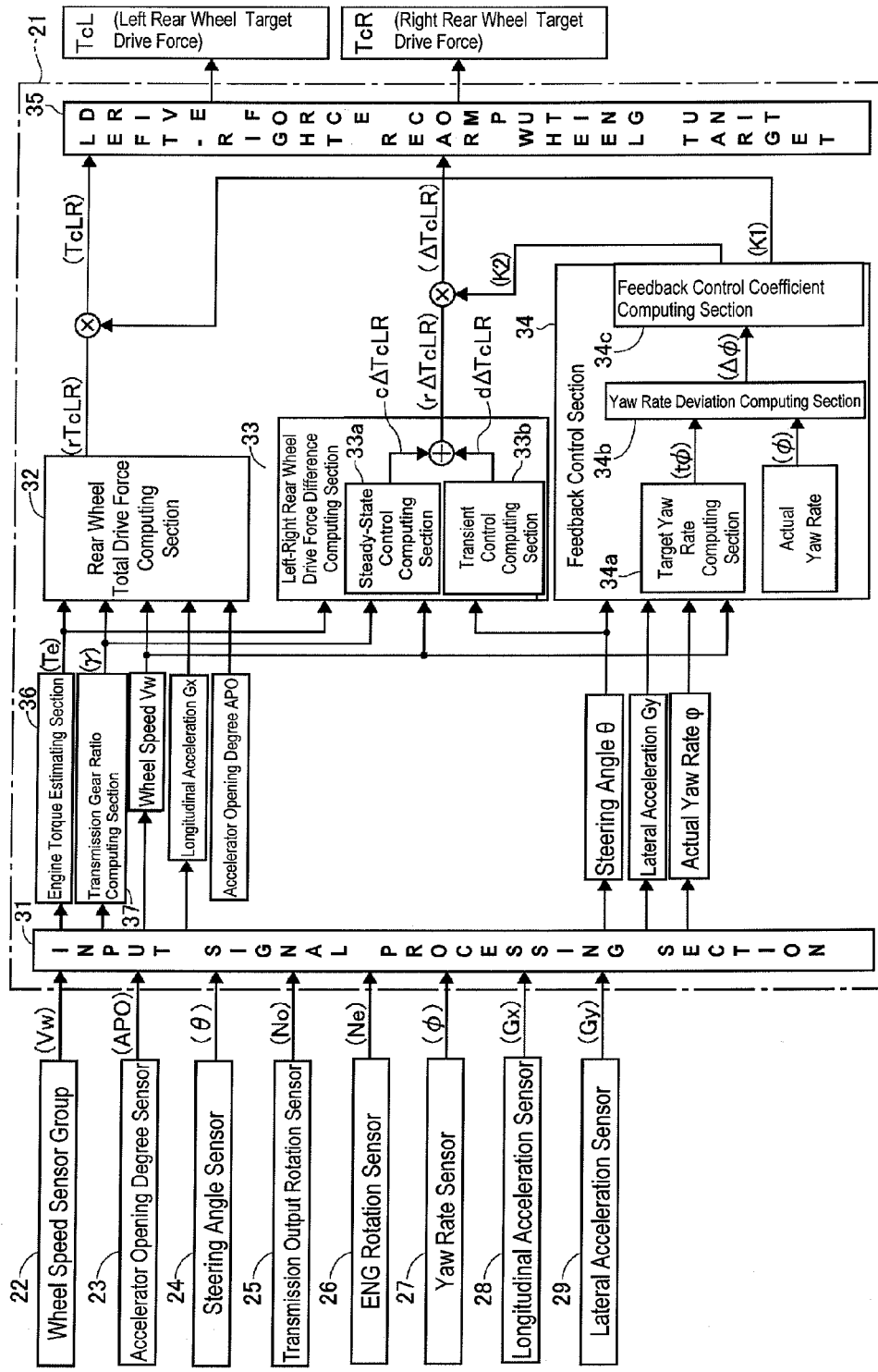
FIG. 2 is a function-specific block diagram of the four-wheel drive controller shown in FIG. 1.

The four-wheel drive controller 21 shown in FIG. 1 controls electric currents supplied to the left rear wheel clutch 11L and the right rear wheel clutch 11R such that the holding forces of the left rear wheel clutch 11L and the right rear wheel clutch 11R correspond to the left wheel target drive force TcL and the right rear wheel target drive force TcR set by the computing section 35 shown in FIG. 2 as explained previously.

Effects of the Embodiment

Effects that are obtained with a left-right wheel (left and right rear wheels) drive force distribution control for a four-wheel drive vehicle according to the embodiment explained heretofore will now be explained.

(1) The transient control computing section 33b is configured as explained previously with reference to FIG. 3. Based on the target yaw rate change rate dtΦ, the left-right drive force difference transient control computation value calculating section 43 finds the left-right rear wheel drive force difference transient control computation value ddΔTcLR, which is a basic target value for achieving the turning response transiently requested by the driver in terms of steering speed at the current vehicle speed VSP. The left-right drive force difference transient control gain computing section 45 finds the left-right drive force difference transient control gain α in accordance with the target yaw rate change rate dtΦ, i.e., finds the left-right drive force difference transient control gain α such that it has a value smaller than 1 in the low speed steering region as exemplified in FIG. 4 or FIG. 5. The transient control computing section 33b then multiplies the left-right rear wheel drive force difference transient control computation value ddΔTcLR by the left-right drive force difference transient control gain α to calculate the left-right rear wheel drive force difference transient control amount dΔTcLR and contributes the same to the left-right wheel (left and right rear wheels) drive force distribution control.

Consequently, with this embodiment, the left-right rear wheel drive force difference transient control amount dΔTcLR is smaller in the region where the target yaw rate change rate dtϕ is low, i.e., the low speed steering region, then in the medium to high speed steering region outside the low speed steering region. The effects obtained as a result will now be explained. In the low speed steering region where the steering speed is low, a high turning response is not requested and the effect of the transient control of the left and right wheel drive force distribution would be small because the responsiveness and trackability performance of the vehicle behavior are high in relation to the steering speed. If the transient control were executed, the fatigue life of power transmitting parts would decline and the fuel efficiency would degrade due to friction losses during power transmission and an increase of electric power consumption caused by the operation of actuators (left and right rear wheel clutches 11L and 11R). Conversely, in the embodiment, the left-right rear wheel drive force difference transient control amount dΔTcLR is decreased in the low speed steering region such that the turning response is decreased in the low speed steering region. As a result, the aforementioned problems of declined fatigue life and degraded fuel efficiency can be avoided.

(2) In this embodiment, in the low speed steering region, the left-right drive force difference transient control gain α is set to gradually decrease as the target yaw rate change rate dtϕ decreases and, consequently, the left-right rear wheel drive force difference transient control amount dΔTcLR decreases gradually as the target yaw rate change rate dtϕ decreases in the low speed steering region. As a result, it is possible to avoid a situation in which the left-right rear wheel drive force difference transient control amount dΔTcLR changes suddenly due to a change of vehicle speed near a border of the low speed steering region and the driver experiences an odd feeling caused by the resulting sudden change of the turning responsiveness.

(3) When the left-right drive force difference transient gain α is set to 0 in the very low speed steering region where the target yaw rate change rate dtϕ<dtϕ1 as shown in FIG. 4, the left-right rear wheel drive force difference transient control amount dΔTcLR is computed to be 0 in the very low speed steering region and the aforementioned problems of decline in the fatigue life and degradation of the fuel efficiency can be solved even more reliably.

(4) As explained previously, in the transient control computing section 33b, the left-right drive force difference transient control computation value calculating section 43 finds the left-right rear wheel drive force difference transient control computation value ddΔTcLR based on the target yaw rate change rate dtϕ and the left-right drive force difference transient control gain computing section 45 finds the left-right drive force difference transient control gain α corresponding to the target yaw rate change rate dtϕ. The transient control computing section 33b then multiplies ddΔTcLR by a to calculate the left-right rear wheel drive force difference transient control amount dΔTcLR. Since the target yaw rate tϕ is set in response to the steering angle θ, the value of the target yaw rate change rate dtϕ increases as the steering speed dθ increases. That is, calculating the left-right drive force difference transient control gain α based on the target yaw rate change rate dtϕ is equivalent to calculating the left-right drive force difference transient control gain α based on the steering speed dθ. In this embodiment, since the left-right rear wheel drive force difference transient control computation value ddΔTcLR is calculated based on the target yaw rate change rate dtϕ, the differentiator used to calculate the steering speed dθ from the steering angle θ can be omitted by calculating the left-right drive force difference transient control gain α based on the target yaw rate change rate dtϕ instead of the steering speed dθ.

Also, the transient control computing section 33b does not calculate the left-right rear wheel drive force difference transient control amount dΔTcLR directly from the target yaw rate change rate dtϕ but, instead, calculates two values (ddΔTcLR and a) based on the target yaw rate change rate dtϕ and finally calculates the left-right rear wheel drive force difference transient control amount dΔTcLR by multiplying the two values together. The left-right drive force difference transient control computation value calculating section 43 serves to calculate the left-right rear wheel drive force difference transient control amount dΔTcLR, which is an ideal value for obtaining the transient turning response based on the target yaw rate change rate dtϕ. The ideal value is constant regardless of the characteristics of the particular vehicle. Meanwhile, the left-right drive force difference transient control gain computing section 45 serves to calculate the left-right drive force difference transient control gain α, which is a revision value for revising the ideal value to α value matched to the actual characteristics of the vehicle. It is necessary for the revision value to vary according to the characteristics of the particular vehicle.

If, hypothetically, the left-right rear wheel drive force difference transient control amount dΔTcLR were calculated directly from the target yaw rate change rate dtϕ, then in order to apply the same left-right drive force transient control to different types of vehicle, it would be necessary to take into account an ideal value characteristic for the transient control response and a revision value characteristic for matching to the actual vehicle characteristics and use the ideal value characteristic and the revision value characteristic to design a parameter for calculating the left-right rear wheel drive force difference transient control amount dΔTcLR based on the target yaw rate change rate dtφ. This would require larger workload. Conversely, by calculating the ideal value and the revision value separately and configuring the device to ultimately revise the ideal value with the revision value, the same left-right drive force transient control can be applied to different types of vehicles by providing an unchanging calculation map for the left-right rear wheel drive force difference transient control amount dΔTcLR (ideal value) and a calculation map for the left-right drive force different transient control gain α (revision value) that varies depending on the vehicle characteristics. In this way, since only the revision value characteristic varies, the same left-right drive force different transient control can be applied to various different vehicles while incurring a smaller workload and the amount of time for developing the control can be shortened.

Other Embodiments

Although a mode of working the vehicle is explained herein based on the embodiment, the specific constituent features of the invention are not limited to the embodiment and various design changes that do not depart from the scope of the invention are included in the invention. For example, although in the embodiment the left-right drive force difference transient control gain a is calculated based on the target yaw rate change rate dtφ, it is acceptable to calculate the same based on the steering speed, i.e., the derivative value dθ of the steering angle θ, instead of the target yaw rate change rate dtφ. In such a case, the differentiator that differentiates the steering angle θ corresponds to the steering speed detecting means.

Although in the embodiment the left-right drive force difference transient control gain α is limited to an upper limit value of 1, it is acceptable to set a value larger than 1 depending on the characteristics of the particular vehicle. Although in the embodiment the target yaw rate change rate dtφ is computed based on the vehicle speed VPS and the steering angle θ and the left-right rear wheel drive force difference transient control computation value ddΔTcLR is computed based on the target yaw rate change rate dtφ, the invention is not limited to this computation method and any computation method is acceptable so long as the left-right rear wheel drive force difference transient control computation value ddΔTcLR is computed based on a transient turning response request of the driver.

The invention claimed is:

1. A vehicle left-right wheel drive force distribution control apparatus comprising:
   a steering speed detecting section that is configured to determine a steering speed; and
   a controller programmed to execute a distributed output of a wheel drive force to left and right drive wheels in accordance with a front-rear wheel drive force distribution control,
   the controller including
      a left-right drive force difference transient control computation value calculating section programmed to compute a left-right drive force difference transient control computation value as a basic target value for a transient control amount of a left-right drive force difference based on the steering speed,
      a left-right drive force difference transient control gain computing section programmed to compute a left-right drive force difference transient control gain based on the steering speed, and
      a left-right drive force computing section programmed to compute a target drive force for each of the left and right drive wheels based on a left-right drive force difference transient control amount obtained by multiplying the left-right drive force difference transient control computation value by the left-right drive force difference transient control gain; and
   the left-right drive force difference transient control gain computing section being further programmed to set the left-right drive force difference transient control gain to be lower while the steering speed is smaller than a first prescribed value as compared to while the steering speed is equal to or larger than the first prescribed value.

2. The vehicle left-right wheel drive force distribution control apparatus according to claim 1, wherein
   the left-right drive force difference transient control gain computing section is further programmed to decrease the left-right drive force difference transient control gain as the steering speed decreases while the steering speed is smaller than the first prescribed value.

3. The vehicle left-right wheel drive force distribution control apparatus according to claim 2, wherein
   the left-right drive force difference transient control gain computing section is further programmed to set the left-right drive force difference transient control gain to zero while the steering speed is smaller than a second prescribed value that is lower than the first prescribed value.

4. A vehicle left-right wheel drive force distribution control apparatus comprising:
   a steering speed detecting section that is configured to determine a steering speed; and
   a controller programmed to execute a distributed output of a wheel drive force to left and right drive wheels in accordance with a front-rear wheel drive force distribution control,
   the controller including
      a target yaw rate change rate computing section that is programmed to compute a change rate of a target yaw rate in accordance with a change of the steering speed,
      a left-right drive force difference transient control computation value calculating section programmed to compute a left-right drive force difference transient control computation value as a basic target value for a transient control amount of a left-right drive force difference based on the target yaw rate change rate,
      a left-right drive force difference transient control gain computing section programmed to compute a left-right drive force difference transient control gain based on the target yaw rate change rate, and
      a left-right drive force computing section programmed to compute a target drive force for each of the left and right drive wheels based on a left-right drive force difference transient control amount obtained by multiplying the left-right drive force difference transient control computation value by the left-right drive force difference transient control gain; and
   the left-right drive force difference transient control gain computing section being further programmed to set the left-right drive force difference transient control gain to be lower while the steering speed is smaller than a first prescribed value as compared to while the steering speed is equal to or larger than the first prescribed value.

5. The vehicle left-right wheel drive force distribution control apparatus according to claim 4, wherein
   the left-right drive force difference transient control gain computing section is further programmed to decrease the left-right drive force difference transient control gain as the steering speed decreases while the steering speed is smaller than the first prescribed value.

6. The vehicle left-right wheel drive force distribution control apparatus according to claim 5, wherein
the left-right drive force difference transient control gain computing section is further programmed to set the left-right drive force difference transient control gain to zero while the steering speed is smaller than a second prescribed value that is lower than the first prescribed value.

* * * * *